R. C. LEWIS.
WEIGHING SCALE.
APPLICATION FILED SEPT. 29, 1909.
1,002,923.
Patented Sept. 12, 1911.
2 SHEETS—SHEET 1.
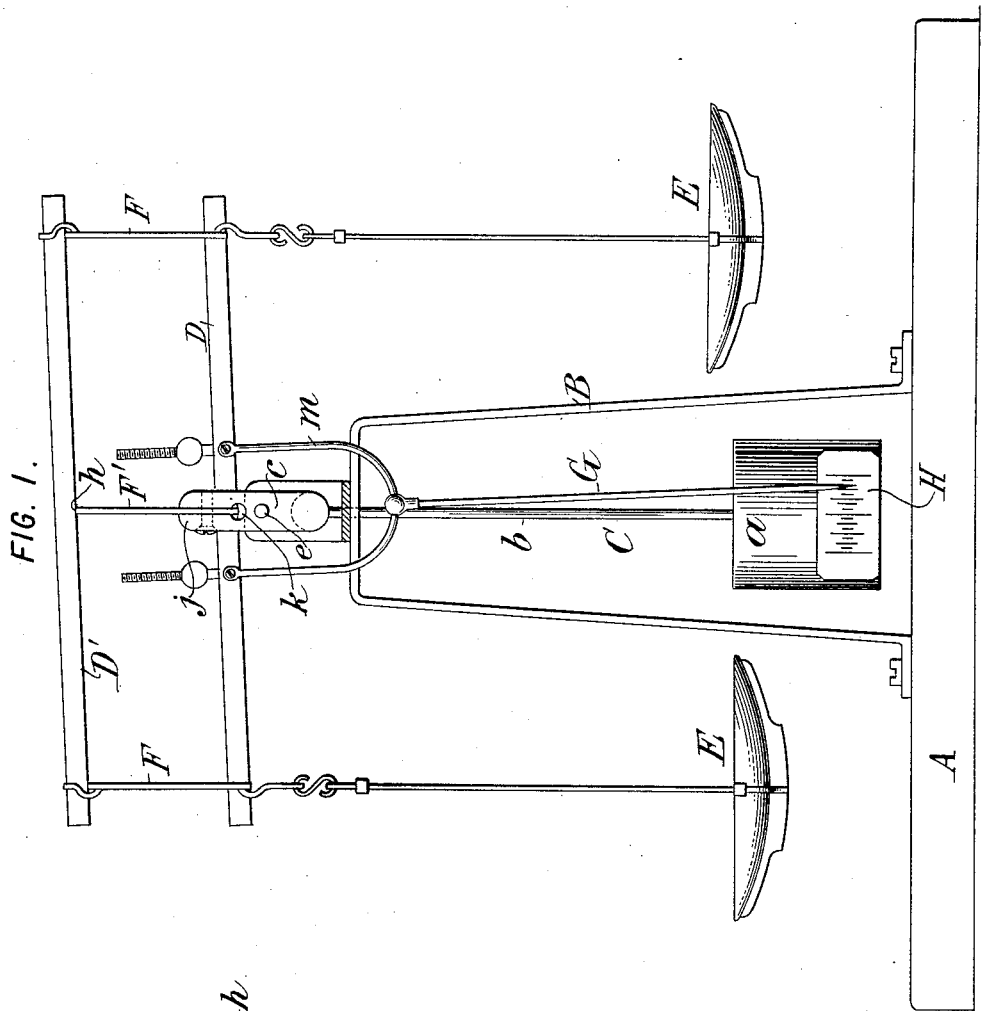
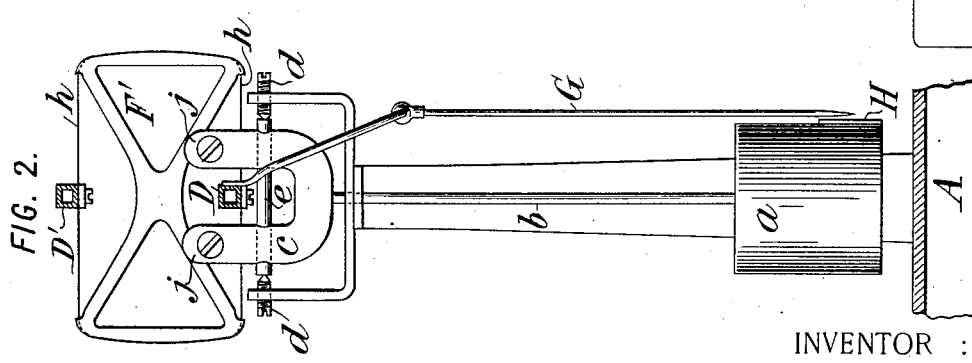
WITNESSES:
INVENTOR:
Rollin C. Lewis,
By Attorneys, R. C. LEWIS.
WEIGHING SCALE.
APPLICATION FILED SEPT. 29, 1909.
1,002,923.
Patented Sept. 12, 1911.
2 SHEETS—SHEET 2.
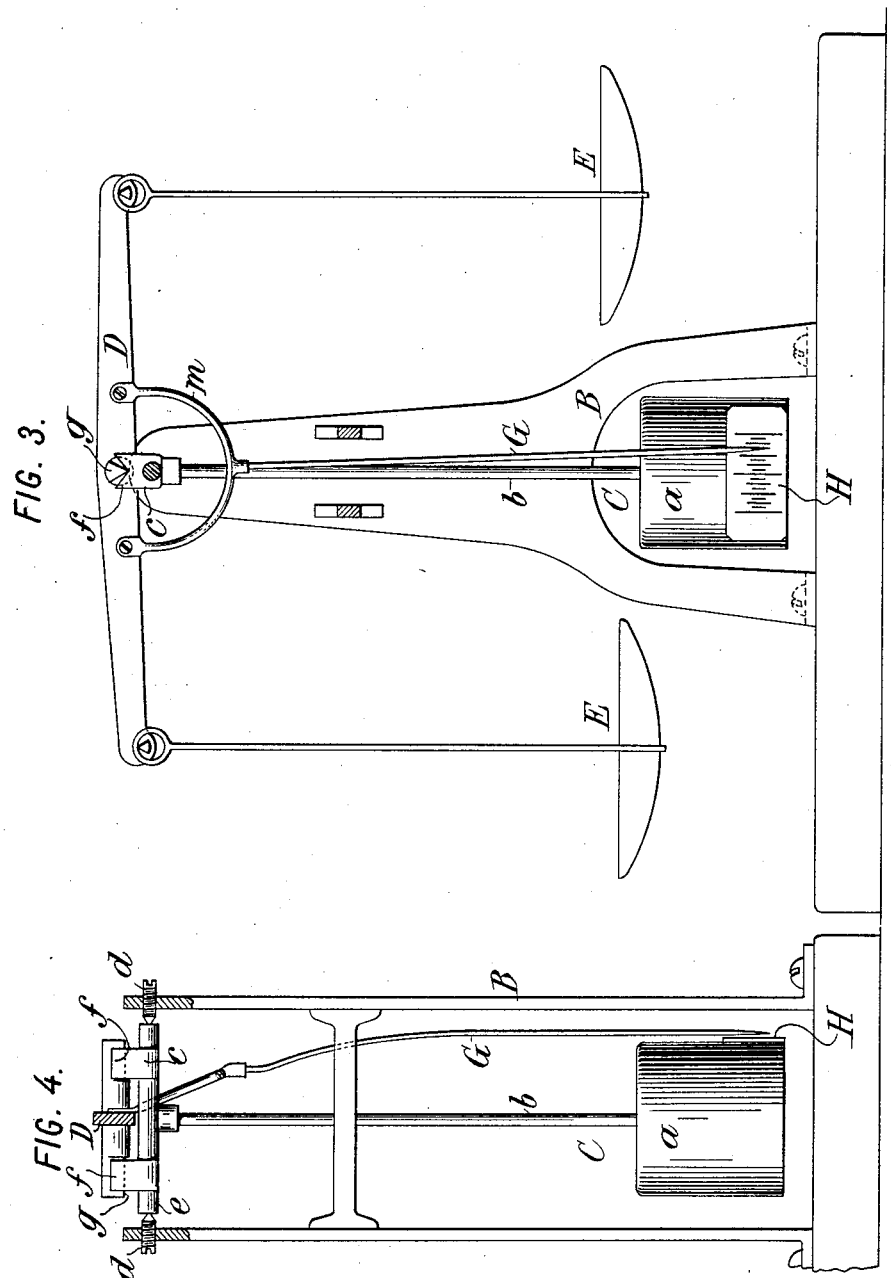
WITNESSES:
Fred White
Rene Bruine
INVENTOR:
Rollin C. Lewis,
By Attorneys,

UNITED STATES PATENT OFFICE.

ROLLIN C. LEWIS, OF STAMFORD, CONNECTICUT, ASSIGNOR TO THE TORSION BALANCE COMPANY, OF NEW YORK, N. Y., A CORPORATION OF NEW YORK.

WEIGHING-SCALE.

1,002,923.   Specification of Letters Patent.   Patented Sept. 12, 1911.

Application filed September 29, 1909. Serial No. 520,066.

*To all whom it may concern:*

Be it known that I, ROLLIN C. LEWIS, a citizen of the United States, residing in Stamford, Fairfield county, Connecticut, have invented certain new and useful Improvements in Weighing-Scales, of which the following is a specification.

This invention relates to weighing scales and particularly to the lighter scales or balances wherein the scale beam is hung upon a standard or other support, and has hung from its opposite ends the scale pans or other provisions for receiving respectively the weight and the material to be weighed. Such scales or balances usually have a platform or base which is designed to be set upon a level surface. Any want of level in the supporting surface is liable to derange the operation of the scale; hence it is common to provide such platform or base with leveling screws by which one end or the other may be raised above the supporting surface to level the scale. The present invention avoids the necessity of such adjustments, and provides a scale which is self-leveling, so that when set upon any support which is even approximately level, the scale will plumb itself. To this end a pendulum is introduced between the scale beam and the support or standard. The scale beam is hung to this pendulum in any suitable way as by the usual knife edge pivots or any equivalent means. The centering pointer commonly carried by the scale beam, instead of pointing with reference to an index or graduation upon the standard, is arranged to coöperate with the pendulum, to which such index or graduation is applied. When the scale is set upon a table or other supporting surface which is out of level, the pendulum plumbs itself and thereby provides a level support for the scale beam, so that no adjustment is necessary before using the scale.

Figure 1 is a side elevation partly in vertical section of a torsion balance scale embodying the present invention; Fig. 2 is a transverse section thereof; Figs. 3 and 4 are corresponding views showing a scale of the ordinary knife edge construction embodying the invention.

In the drawings, let A designate the base, B the standard fixed thereto, C the pendulum as a whole which is hung pivotally from the standard, D the scale beam or balance beam which is hung or pivoted at its middle to the pendulum, and E E the scale pans or other provisions for receiving or suspending the weight and the material to be weighed. The pendulum comprises a weight or bob *a*, a stem *b*, and a head *c*. The standard has any suitable form of pivotal support for the pendulum. For this purpose pivot screws *d d* are shown the points of which engage the ends of a transverse bar *e* forming part of the head *c*. The construction of the standard B may be greatly varied, it being only necessary that it provide a support for the pivot screws at the proper height above the base, and without interfering with a suitable swing of the pendulum, or with the necessary movements of the scale pans. Two constructions of standard are shown by way of example in the drawings.

The scale beam D may be hung upon the pendulum head, or other suitable part of the pendulum, by any known pivotal means. In Figs. 1 and 2 it is shown as hung by means of a torsion pivot. In Figs. 3 and 4 it is shown as hung on knife edges. In the latter case the head *c* has upward projections *f f* in which are formed the angular notches which receive the knife edges *g* upon the scale beam. In the torsion balance construction shown in Figs. 1 and 2, the scale beam is duplicated, the upper or parallel beam D′ being hung directly over the lower beam, and connected to it at the middle and both ends by the usual torsion trusses or harps F F F′, the latter or middle truss being the support upon which the beams are pivoted through the medium of the torsion wires or bands *h h*, in a manner well known with reference to torsion balances. The only difference in construction between this scale and an ordinary torsion balance is that by reason of the introduction of the pendulum the middle truss F′ is fastened to the pendulum head instead of to the supporting standard. As a means of such fastening I have shown the pendulum head *c* prolonged upwardly to form clamping arms *j j*, which are split or forked to receive and clamp the truss, and have a transverse opening *k* to permit the free passage through them of the lower torsion wire or band *h*. Thus the beams D D′ rest as usual upon the middles of the torsion wires *h h* which are stretched between the ends of the truss, and the latter is supported in a normally stationary manner by being clamped fast to the pendulum head, so that the pendulum necessarily maintains this truss in a vertical plane. The trusses F F, being mounted parallel to the middle truss, also maintain vertical planes during the movement of the scale beam; they are prolonged downwardly in the usual manner, and from them are hung the scale pan holders or other provisions for suspending the weights and material.

The scale beam has attached to it in an essentially rigid manner, the usual pointer G for indicating upon an index or graduation H when the scale is in poise. But the graduation H instead of being applied to the standard or other fixed part, is applied upon the pendulum bob $a$, so that the zero point thereof is brought to plumb by the gravitating movement of the pendulum. Hence, however out of level the base may be, the pendulum will (within certain limits) plumb itself and thereby provide a level pivotal base for the scale beam, and at the same time bring the graduation H into plumb so that it presents the true relation to the scale beam. The pointer G may be constructed and attached to the scale beam in any known or suitable manner, preferably being connected through a loop or bracket $m$ as shown.

The present invention is subject to a wide range of modification without departing from its essential features. Thus for example the standard B may be substituted by any other support; the pivot screws $d\ d$ may be substituted by any other form of mounting or suspension for the pendulum; the pendulum itself may be variously constructed; and the scale beam or beams may be of any suitable or known construction, and be hung upon or suspended from the pendulum, according to any known or suitable pivotal construction.

I claim as my invention:—

1. A scale comprising a support, a pendulum hung thereon, and a scale beam hung on said pendulum, its pivotal axis being in a vertical plane substantially coincident with the pivotal axis of the pendulum.

2. A scale comprising a support, a pendulum hung thereon and projecting above its pivot point, and a scale beam hung on the upwardly projecting portion of said pendulum upon an axis in a vertical plane substantially coincident with the pivotal axis of the pendulum.

3. A scale comprising a support, a pendulum hung thereon, and a balance beam hung on said pendulum upon an axis in a vertical plane substantially coincident with the pivotal axis of the pendulum and with scale pans supported at opposite ends of said beam.

4. A scale comprising a support, a pendulum hung thereon, a scale beam pivoted to said pendulum upon an axis in a vertical plane substantially coincident with the pivotal axis of the pendulum, and a pointer carried by said beam and coöperating with said pendulum.

5. A scale comprising a support, a pendulum hung thereon and carrying an index, a scale beam hung on said pendulum upon an axis in a vertical plane substantially coincident with the pivotal axis of the pendulum, and a pointer carried by said beam and traversing the index on said pendulum.

6. A scale comprising a support, a pendulum hung thereon, parallel scale beams, a truss carried in a vertical plane by said pendulum, having torsion supports for said beams, the plane of said truss substantially coincident with the pivotal axis of the pendulum, and trusses having torsion supports connected to the opposite ends of the beams.

7. A scale comprising a support, a pendulum hung thereon, parallel scale beams, a truss carried in a vertical plane by said pendulum, having torsion supports for said beams, the plane of said truss substantially coincident with the pivotal axis of the pendulum, scale pans, and trusses supporting said pans and having torsion supports connected to the opposite ends of said beams.

In witness whereof, I have hereunto signed my name in the presence of two subscribing witnesses.

ROLLIN C. LEWIS.

Witnesses:
 CHARLES E. VAIL,
 GEORGE M. CONWAY.